B. F. Sturtevant,
Uniting Tubes.
No. 100,243.    Patented Feb. 22, 1870.
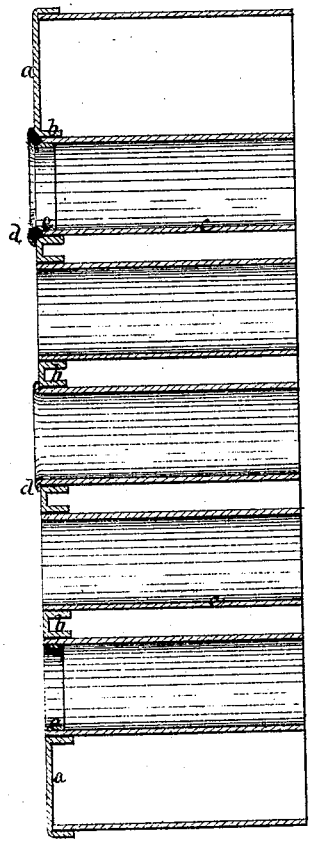

United States Patent Office.

B. F. STURTEVANT, OF JAMAICA PLAIN, MASSACHUSETTS.

Letters Patent No. 100,243, dated February 22, 1870.

IMPROVEMENT IN UNITING TUBES TO TUBE-SHEETS.

The Schedule referred to in these Letters Patent and making part of the same.

To all whom it may concern:

Be it known that I, B. F. STURTEVANT, of Jamaica Plain, Norfolk county, Massachusetts, have invented certain new and useful Improvements in Uniting Tubes for Tube-Sheets; and I do hereby declare that the following, taken in connection with the drawings which accompany and form part of this specification, is a description of my invention sufficient to enable those skilled in the art to practice it.

For apparatus designed either for heating or cooling fluids, in which metal tubes are employed for passage ways for one fluid, it is an object to have the tubes extremely thin, so as to retard, to the least possible degree, transmission of heat or cold through them, and for the purpose of having a substantial uniform degree of expansion and contraction with the tubes under thermal changes, it is very desirable that the tube-sheets should be of a corresponding thinness with the tubes, such thin tube-sheets also yielding, so as to assume a somewhat concave or convex form, according as the tubes contract or expand.

In uniting such thin tubes and tube-sheets, some mechanical difficulties present themselves, to overcome which and to make a perfect and effective union of such thin tubes and tube-sheets, is the object of my invention, which is illustrated in the accompanying drawings, the same being a sectional elevation, taken through a series of thin tubes united to a thin tube-sheet.

The tube-sheet is first punched with holes of a smaller diameter than the outside diameter of the tubes, and then the metal of the sheet around the holes is flanged by the operation of suitable swages or dies, the metal of the tube-sheet being of copper or copper alloys, sufficiently ductile to admit of said flanging operation.

The tube-sheet in the drawings is denoted by $a$, and the flanges mentioned, which are integral with the sheet, are denoted by $b$.

The interior diameter of the flanged holes in the tube-sheet is made equal to the outer diameter of the thin tubes $c$, of copper or copper alloys, and the ends of the tubes $c$ are inserted in the flanged holes, and are soldered therein.

To increase the strength of the union between the tubes and the tube-sheets, the ends of the tubes may be left projecting beyond the plain surface of the tube-sheet, and then turned outward and down upon the tube-sheet, as seen at $d$, this making a rounded or beaded finish of the tube end, and in all cases thin ferrules are inserted within the tube ends, as seen at $e\ e$, and soldered at the same time that the tube ends are soldered to the flanges of the tube-holes in the tube-sheet.

I claim the method of preparing tubes and tube-sheets, and uniting them by flanging the tube holes in the tube-sheets, soldering the ends of the tubes to the tube-hole flanges, turning over the ends of the tubes or not, as may be desired, and strengthening the union between the tubes and tube-sheets by inserting ferrules in the ends of the tubes and soldering them thereto, substantially as described.

B. F. STURTEVANT.

Witnesses:
J. B. CROSBY,
FRANCIS GOULD.